Oct. 15, 1968 S. OKTAY 3,406,244

MULTI-LIQUID HEAT TRANSFER

Filed June 7, 1966

INVENTOR
SEVGIN OKTAY

BY Robert W. Ely
ATTORNEY

United States Patent Office 3,406,244
Patented Oct. 15, 1968

3,406,244

MULTI-LIQUID HEAT TRANSFER

Sevgin Oktay, Beacon, N.Y., assignor to International Business Machines Corporation, Armonk, N.Y., a corporation of New York Filed June 7, 1966, Ser. No. 555,730
7 Claims. (Cl. 174—15)

ABSTRACT OF THE DISCLOSURE

A cooling system is provided for cooling heat generating electronic components which are completely immersed in a liquid having a low temperature boiling point. This dielectric liquid, such as a fluorcarbon, preferably boils only somewhat above ambient room temperature at atmospheric pressure. A second liquid having a lower density and a higher boiling point than the first mentioned liquid is superimposed on the first liquid resulting in an interface between the two liquids where nucleate boiling bubbles generated in the first fluid are principally condensed. The superimposed liquid is maintained at a predetermined temperature by means of a cooling arrangement.

This invention relates to heat transfer and more particularly concerns methods and means for cooling a heated element, such as an electronic element, by heat exchange with a liquid to give boiling action.

In the prior art, it has been proposed to cool electric devices or components by direct heat exchange with a liquified refrigerant. The Greene patent (No. 2,643,282) proposes immersing a radio chassis in a liquified refrigerant and then conventionally condensing externally by means of a compressor and condensing coil. The Whitman patent (No. 2,774,807) teaches a similar arrangement for a transformer and proposes to condense "Freons" and fluorcarbons by radiator tubes and a noncondensable gas, such as sulphur hexafluoride. The Goltsos patent (No. 3,204,298) proposes an evaporative-gravity cooling arrangement in which vaporated liquid, such as FC–75 (3M trade designation for $C_8F_{16}O$), is condensed by a cold plate. These and other prior art proposals have disadvantages. For example, in electronic solid-state computer applications, it is not desired to operate with a high pressure cooling system since lead sealing, general leakage and non-accessibility present problems and undesired arrangements. Another disadvantage resides in a poor heat transfer rate among "percolated" bubbles and the heat extraction means especially where an external compressor is not used.

An object of the present invention is to ovrcome these problems and disadvantages by providing novel means for condensing bubbles of a liquid refrigerant which is heated by an element, such as ferrite-core, memory arrays of a computer.

Another object is to provide a new, improved method for efficient heat transfer in which heat-generated vapors of a liquid contacting a heated element are condensed without typical compression or indirect heat exchange.

A further object is the provision of a novel heat transfer method and means in which nucleating vapors from a boiling liquid are directly condensed by a superimposed liquid or liquids.

An additional object is the provision of a heat transfer method and apparatus which is especially useful for cooling electronic devices, such as computer parts, since ambient pressures and near-ambient temperatures are used whereby leakage is avoided and accessibility for change is possible.

In accordance with a disclosed embodiment of the invention, a first liquid is in direct contact with a computer memory array and a second liquid is superimposed on the free surface of the first liquid. The first liquid preferably boils at atmospheric pressure only somewhat above ambient room temperature. When the first liquid is thus heated, bubbles are formed and condensed principally at least at the interface of the two liquids. This is achieved by proper correlation in the selection of liquids, their volumes, their interface surfaces, and the rate of heat generation. Preferably, the superimposed liquid is maintained at a predetermined temperature. The disclosed system is constructed to operate at ambient temperatures and pressures and has an external system for cooling the condenser liquid which preferably is water or a silicate ester. The boiling liquid preferably is a dielectric liquid, such as perfluorodimethyl cyclobutane.

The realization of the above objects and others, along with the advantages and features of the invention, will be apparent from the following description and the accompanying drawing in which.

Figures 1, 2, 3:
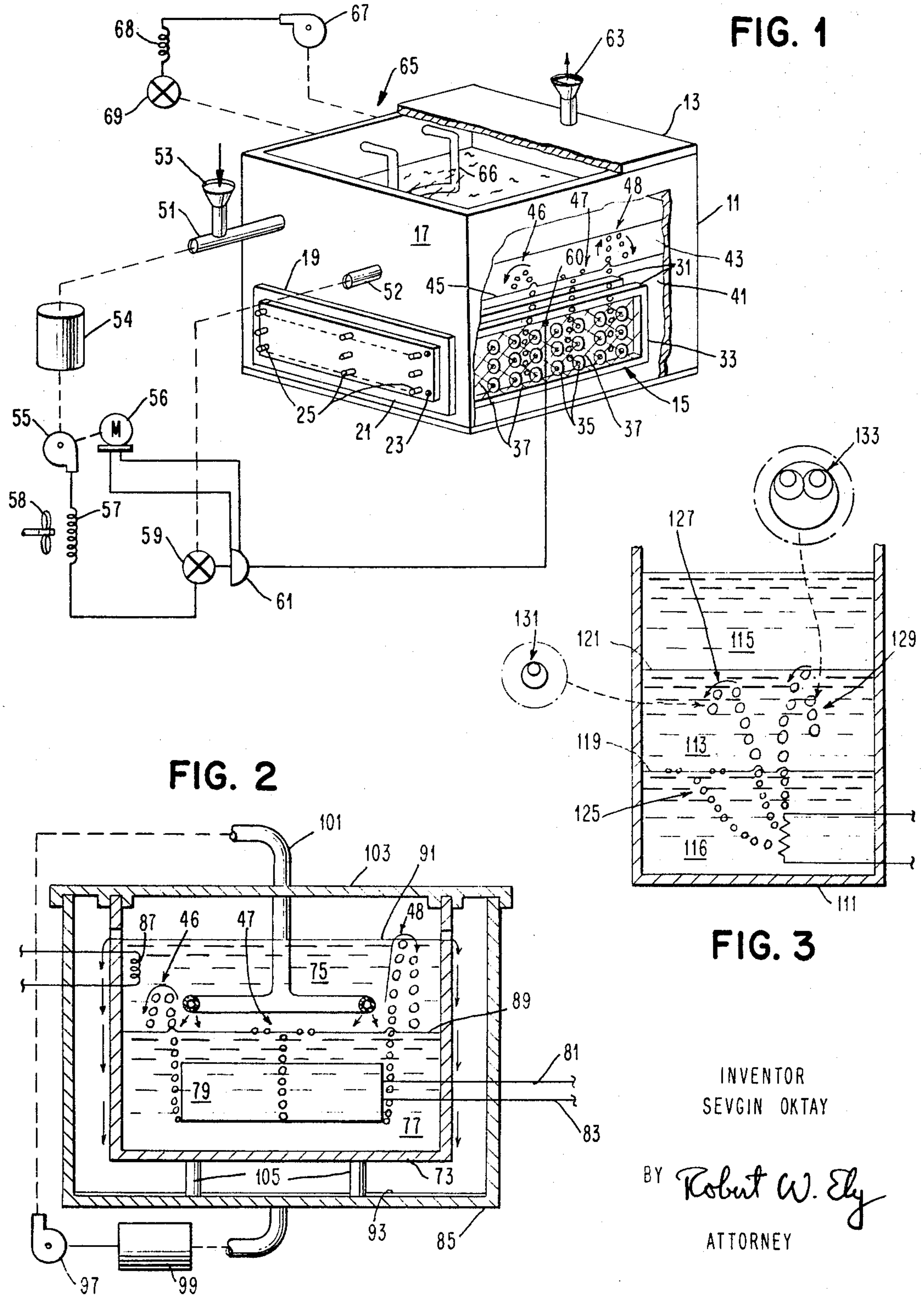
FIG. 1 is a broken-away perspective view of a computer memory array mounted in a container and illustrates how a liquid contacting the heat-generating array forms bubbles which are condensed by a superimposed liquid.
FIG. 2 is a partially-schematic, cross-sectional showing of another embodiment and shows the generation of bubbles, their condensation and return to the interface.
FIG. 3 is a schemtaic showing of the use of three liquids providing multilocation condensation of vapors from the lowest liquid.

In FIG. 1, a liquid-tight container 11 has a slip-on cover 13 and a memory array 15 located therein which is electrically connected through a wall 17 of the container. The wall 17 has a rectangular opening (not appearing) which has an atmospheric sealing gasket 19. A memory array mounting block 21 is attached by screws 23 to the container within the periphery of the rubber gasket 19. Liquid-sealed block 21 has outwardly projecting pins 25 for electrically connecting the memory array to conventional memory drive, sense and other means. The array 15 has a plurality of memory planes 31 which include a frame 33, ferrite cores 35 and wires 37 passing through the doughnut-shaped cores.

The array 15 is immersed in a first liquid 41 (such as the above mentioned fluorocarbon) which boils at about 113° F.±5° F. under atmospheric pressures (for example, 12.0 to 16.0 p.s.i.a.). A second liquid 43 having a relatively higher-boiling-point temperature is superimposed on the free surface of the first liquid so that an interface 45 is formed. Three sets of bubbles 46, 47 and 48 are shown. The middle set 47 shows the preferred method since the bubbles are condensed at the interface 45 due to the correlation of liquid selection, the interface area, the boiling point temperatures, the heat absorption rates, the ambient temperature and pressure, the volumes of the liquids, and the maximum rate of heat generation from the directly-contacted cores, wires, and frame connections. The left set of bubbles 46 shows the second method wherein essentially all bubbles are condensed at the interface and within the second liquid. The right set of bubbles 48 show the foregoing condensation plus condensation at the surface of the second liquid. These modes will be further explained.

The means for cooling the upper, condensing liquid 43 includes an outlet pipe 51 and an inlet pipe 52, both extending through a side wall of the container 11. The outlet pipe has a make-up funnel 53 and connects to a storage tank 54. A pump 55 having motor 56 receives liquid from the tank and pumps it through a cooling coil 57, which has fan 58 for cooling, to a thermostatically controlled valve 59. The temperature sensor 60 for the valve is mounted near the top of the memory array 15. The bellows valve operator 61 also operates the pump motor 56 via a switch (not shown). Valve 59 connects to inlet pipe 52. A thermocouple temperature control is alternately useful.

This arrangement has the advantage of remotely locating the heat dissipating means so that the computer area is not burdened. Since temperature controlled well or river water could be used in some situations, it is apparent that a flow-through system can be used. Further, it is apparent that an inexpensive, readily-evaporated inert liquified gas can be added at a regulated rate through funnel 53 and released through top vent 63. Also, it is contemplated that indirect cooling of the top liquid be done by a circulating or evaporative coil 65 which has a conventional cooling section 66 including compressor 67, condenser 68 and temperature responsive valve 69.

It is apparent that other heat-absorbing, low-boiling liquids are useful, such as chlorinated fluorcarbons generally known as Freons (Reg. TM–Du Pont). When the electric devices (memories, circuit modules for logic, etc., and power supplies) are suitably insulated, non-dielectric liquids are used. Mercury is suitable when the heat generating rate is sufficient as found in transformer or nuclear reactor installations. The condenser liquid, of course, is essentially immiscible in the heat absorbing liquid, is lighter in weight, and has an appreciably higher boiling point than the boiling liquid. For example, with mercury as the boiling liquid, polyphenyls (page 172, Heat Transfer Media, 1962, Reinhold) or liquid nitrogen is used. It is also desirable to use liquid potassium and the lighter liquid potassium-sodium when nuclear reactor conditions (such as found in submarines) are encountered.

Referring to FIG. 2, the container 73 has condenser liquid 75 and boiling liquid 77 in which is immersed an electronic module or other heat generating device 79. It is apparent that the device could transmit heat through the bottom container wall, for example, by conduction. Two connecting wires or leads 81 and 83 extend from the module 79 through the liquid 77 through a side wall to the exterior of the copper-wall container 73 and the surrounding enclosure 85. These wires are insulated if the lower liquid is not dielectric. The coating on the module is such as to give protection to the module, if the boiling liquid is not dielectric. A cooling coil 87 is positioned in the condensing liquid to adequately remove the heat absorbed in condensing. As mentioned, the modes of condensing the vapor bubbles at, and above, the two-liquid interface 89 will be further described as observed in operations in which heat input was gradually increased. The cooling coil 87 is a secondary means for removing heat in this embodiment. Inner rectangular container 73 has a plurality of overflow orifices 91 at the level of the condensing liquid so that warm liquid continuously overflows and dribbles down the "wetting" surfaces of the copper walls. A pool of liquid 93 collects, above the bottom wall of enclosure 85. This pool 93 is maintained at a predetermined level by a suitably-controlled pump 97 which draws the liquid through heat exchanger 99. The heat exchanger dissipates the heat at a remote location or has cooling liquid flowing therethrough to waste. Pump 97 discharges the cooled liquid to pipe 101 which distributes the cooled liquid adjacent the interface 89. The arrows suggest how the return liquid is sprayed to the location of the interface so that bubbles are condensed at an early stage. The two containers are closed off by a single cover 103. Supports or legs 105 position the inner container above the bottom wall of the outer enclosure. The lateral gap between the containers is minimal since there is limited space. This spacing (1/16") is enlarged on the drawing for clarity. The overflow, of course, contributes to cooling of the inner container and its contents. Sets of bubbles 46, 47 and 48 are shown in FIG. 2 and correspond in general to the sets of bubbles shown in FIG. 1.

With the overflow arrangement, the heat transfer rate of the entire system is increased and a more efficient system results. The overflowing liquid is selected to have a large heat absorbing capacity.

As above mentioned, the condenser liquid preferably is water or silicate ester. The surface tension values of these two liquids are respectively (in dynes per centimeter) 25 and 72. Thus, the bubbles in silicate ester are smaller. The preferred boiling liquids in order are perfluorodimethyl cyclobutane (as supplied by Du Pont) or the fluorcarbon liquid which is marketed by Minnesota Mining and Manufacturing and designated as FC 78 (B.P. 122±10° F). The condenser liquid is essentially immiscible in the heat-absorbing boiling liquid. The aforementioned sodium and potassium metal system has an interface since the boiling liquid is saturated (the condenser molten material being in a quantity which exceeds the solubility). It is also feasible to use liquid sodium and an inert liquid which has a higher specific gravity and a lower boiling point. For example, in space re-entry or deep-sea activities, the temperatures and/or the pressures will provide an environment for the present heat transfer method using liquid sodium, wherein a heat flux moves from a heavier molten material to an interface formed with a lighter liquid-like material so that gas-like formations are condensed principally at the interface.

In FIG. 2, the evolution of gas-like formations or "bubbles" is again more-or-less schematically illustrated in enlarged fashion. Thus, the intermediate set of bubbles suggests the generation of bubbles and the condensation thereof at the interface of the liquids. This is the preferred mode since it gives the maximum heat transfer rate with the least operating complications. When a small bubble arrives at the interface, it floats temporarily and then, due to pressures and contact with the condensing liquid, condenses to liquid or sometimes implodes (collapses in an internal direction). The disintegration of the floating bubbles gives very small bubbles which also "ride" the interface giving maximum heat transfer (maximum bubble surfaces to the condensing boundaries of the condenser liquid). The various factors (such as heat influx) are correlated to give this preferred mode whereby the small bubbles or generated gas-like formations are principally condensed at the interface. The bubbles, in some instances, are "divided" as to mode of condensation. Dependent upon the heat input rate, small bubbles move horizontally to form large bubbles. The large bubbles are formed by the merging of small bubbles until sufficient buoyancy develops to give a raise from the interface. Thus, the just-described mode combines with condensation of large bubbles in the body of the condenser liquid as when heat input is increased. By both these modes, condensation is essentially completed by contact with the upper liquid. Of course, a small number of large bubbles might pass up to the surface of the condenser liquid. At the condenser liquid surface, condensation is effectively complete since essentially all of the large bubbles reaching this surface are condensed at this surface. With a further increase in heat input, the second mode predominates. An insignificant number of bubbles might break through this surface to the space above. In the preferred mode, this is a rarity. In some applications—as where the space for the two liquids is at a minimum—the heat input rate is selected to deliberately give vapor escape so that remotely-located heat dissipation with pressurizing and condensation can be done. For example, FIG. 1 outlet pipe 51 and associated equipment can be arranged to compress and condense vapors. An attempt to show the downward movement of globules (boiling substance as a formation of liquid and vapor) is made in FIG. 2 by arrows with the left and right sets of bubbles 46 and 48. The downward movement of globules is observed constantly but an adequate, proved explanation is only theoretical and not yet substantiated. Further description of these downward-moving globules will be made with reference to FIG. 3.

In FIG. 3, a three-liquid system is shown in container

111. The above criteria apply, except that the intermediate liquid 113 does not have to have the heat capacity to essentially condense all of the bubbles since the remaining bubbles condense at the interface with the top liquid 115. Preferably, the bubbles generated in the bottom liquid 116 at the heat producing device 117 will be condensed principally at the lower interface 119 and in the intermediate liquid 113. The upper interface 121 preferably condenses essentially the remainder of the bubbles from the bottom liquid. A difference of boiling points (liquid-to-liquid) is selected so as to provide this operation. In selecting liquid materials, considerations of solubility, boiling points and inertness at the interfaces are primary. A silicate ester, water and fluorcarbon (such as $C_6F_{12}$) are suitable for three liquid-like systems. The three xylenes (meta, para and ortho) or nitrogen, oxygen and argon can be used under suitable pressure. Of course, oxygen and argon are suitable for the two liquid systems above described. For two molten metal systems, the following pairs of metals are suitable: cadmium-iron, zinc-lead, chromium-bismuth and lead-iron.

Referring to the showings of bubbles in FIG. 3, the left set 125 is the preferred mode of condensation at the interface as above described. The center set of bubbles 127 comprises small bubbles in the bottom liquid, larger bubbles in the intermediate liquid and descending or returning globules. One of these globules 131 is enlarged at the left to show in all likelihood a half-moon of liquid and a sphere of gas. This phenomenon is not clearly understood. Of course, some condensation at interface 121 results in droplets of solid liquid. The right set of bubbles 129 shows small bubbles merging at the interface into large bubbles which escape the interface 119 and ascend into liquid 113 to interface 121 and then descend. Above the container an enlarged, descending, double-globule 133 is shown and is comprised of two liquid-gas spheres (as above described) in another larger enveloping sphere. The showing of the portion of the left set of bubbles 125 at the interface 119 is also intended to suggest horizontal movement of small bubbles to merge into a surface formation which breaks away into a large bubble.

From the foregoing, it is clear that the disadvantage of having a net vapor generation as results from boiling a single liquid is avoided. Since with the present invention the bubbles are essentially entrapped and condensed within the liquid bulk, net vapor generation does not result. The condenser liquid is so selected to suitably have a lower density than, immiscibility with, higher boiling point than, a chemical inertness to, and a higher specific heat than the boiling liquid so that a very high rate of heat transfer results. The various factors are so correlated that the nucleated, small bubbles rise to the interface and then move horizontally. In effect, the bubbles are trapped. The continued condensation is, of course, facilitated by the remote cooling of the condenser liquid. Only a relatively thin layer of the stationary boiling liquid which is a high quality dielectric coolant is needed for conventional electronic applications.

While the invention has been particularly shown and described with reference to preferred embodiments thereof, it will be understood by those skilled in the art that various changes in form and details may be made therein without departing from the spirit and scope of the invention.

What is claimed is:

1. A system for cooling heat generating electronic components comprising:

a container, a low boiling point temperature liquid located in a bottom portion of said container, said heat generating electronic components being immersed in said low boiling point liquid, means for energizing said electronic components so as to cause a temperature rise therein which causes vaporization boiling bubbles at said electronic components, said boiling bubbles rising to the surface of said low boiling point liquid because of their lighter density, a higher boiling point temperature liquid having a lower density than said low boiling point liquid and being immiscible therewith located in said container above said low boiling point liquid and forming a liquid interface therebetween, means for maintaining said higher boiling point liquid at a predetermined lower temperature than said low boiling point liquid so that said boiling bubbles will be condensed at said interface and in said higher boiling point liquid.

2. A system in accordance with claim 1, wherein the volumes and temperatures of said low and high boiling point liquids are selected in relation to the amount of heat generated by said electronic components so as to cause said boiling bubbles to be substantially condensed at said interface between said low and high boiling point liquids.

3. A system in accordance with claim 1, wherein said low boiling point liquid is a dielectric liquid.

4. A system in accordance with claim 1, wherein a further higher boiling point liquid is superimposed on said higher boiling point liquid forming a further interface therebetween, means for maintaining the temperature of said further higher boiling point liquid at a lower temperature than said higher boiling point liquid upon which it is superimposed so that boiling bubbles reaching the further interface will be condensed.

5. A system according to claim 1, wherein said higher boiling point liquid is water, and said means for cooling said higher boiling point liquid is a remote cooling means including a heat exchanger.

6. A system according to claim 5, wherein said remote means for cooling said higher boiling point liquid includes a liquid return means which returns the cooled liquid to the area in the higher boiling point liquid adjacent the interface.

7. A system according to claim 1, wherein said means for cooling said higher boiling point liquid includes means by which said higher boiling point liquid overflows and runs down the sides of said container to provide cooling thereof.

References Cited

UNITED STATES PATENTS

| | | | |
|---|---|---|---|
| 3,091,722 | 5/1963 | Borowiec et al. | 174—17 X |
| 2,886,746 | 5/1959 | Saby | 174—15 |
| 2,831,173 | 4/1958 | Whitman | 336—58 |
| 2,643,282 | 6/1953 | Greene | 317—100 X |
| 2,479,373 | 8/1949 | Knotts et al. | 174—15 |
| 2,214,865 | 9/1940 | Troy | 174—15 |
| 854,312 | 5/1907 | Skinner et al. | 174—15 |

FOREIGN PATENTS

| | | |
|---|---|---|
| 887,383 | 1/1962 | Great Britain. |

LEWIS H. MYERS, *Primary Examiner.*

A. T. GRIMLEY, *Assistant Examiner.*